July 9, 1935. W. D. COOLIDGE 2,007,890
VOLTAGE REGULATOR FOR ELECTROSTATIC MACHINES
Filed March 29, 1934
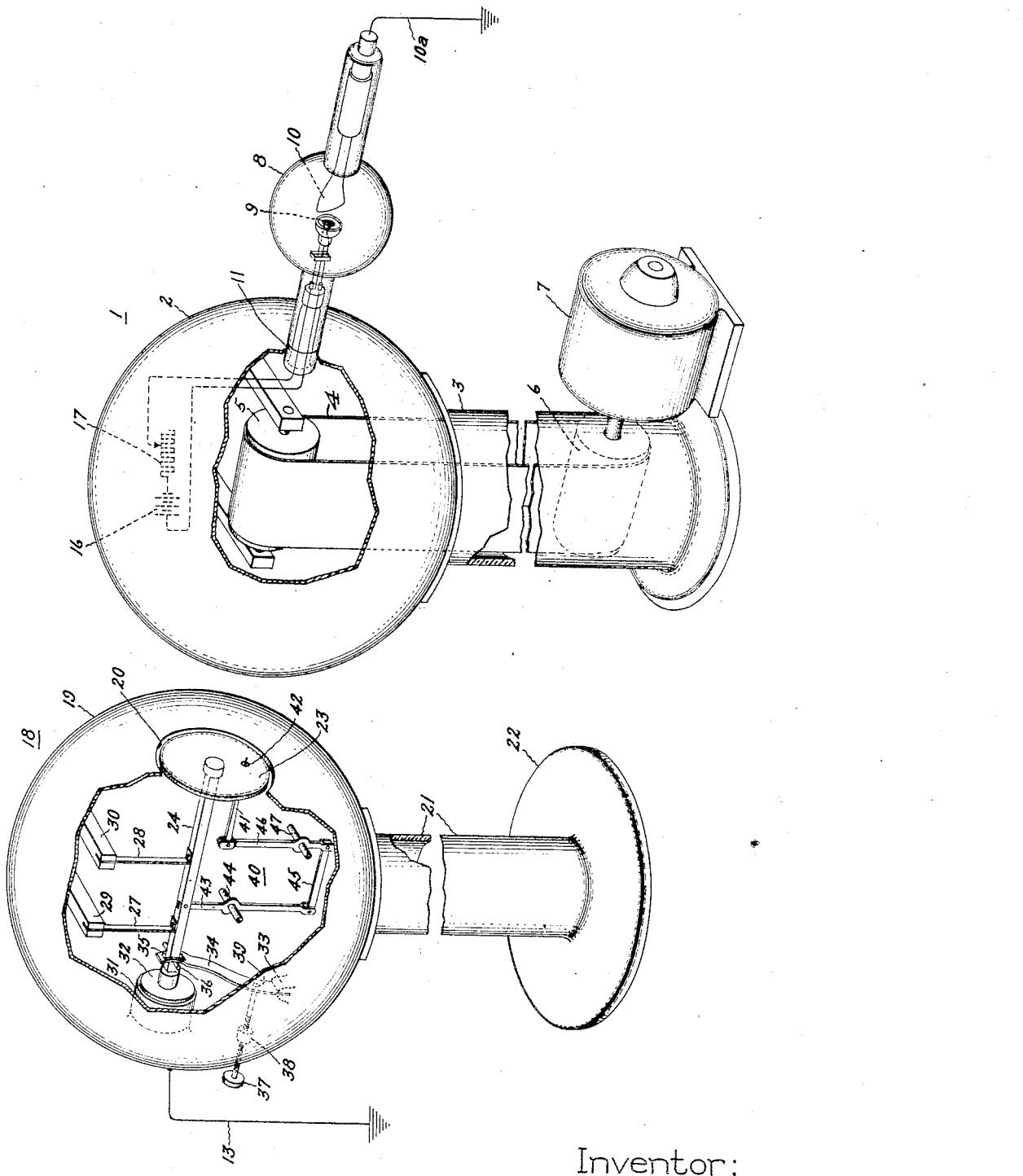
Inventor:
William D. Coolidge,
by Harry E. Dunham
His Attorney.

Patented July 9, 1935

2,007,890

UNITED STATES PATENT OFFICE 2,007,890

VOLTAGE REGULATOR FOR ELECTROSTATIC MACHINES

William D. Coolidge, Schenectady, N. Y., assignor to General Electric Company, a corporation of New York Application March 29, 1934, Serial No. 717,945

12 Claims. (Cl. 171—312)

My invention relates to voltage regulators for electrostatic machines.

With the development of electrostatic machines having a relatively high current output, for example in the neighborhood of 4 milli-amperes at one million volts, it has been found feasible to utilize such machines to produce the high voltages frequently required for electrical testing, or for exciting electric discharge devices such as X-ray tubes.

In using an electrostatic machine to operate a vacuum tube it is highly desirable to have some arrangement for regulating the voltage. An electrostatic machine will in general deliver to its high-voltage terminal a current which is proportional to the speed at which the machine is driven. If a larger current is delivered to the high voltage terminal than is being supplied to the load, there will be an accumulation of charge thereon and a steadily increasing voltage will be built up. A state of equilibrium will be reached at an indeterminate high voltage when there is as much current leaving the high-voltage terminal as there is entering it. On short circuit the machine will of course deliver no voltage, while on open circuit the voltage will rise until the current leaking from the high-voltage terminal is equal to the current entering the high-voltage terminal. If the machine is being utilized to operate a vacuum tube operating on full saturation, the current flowing through the tube cannot increase and the only voltage-stabilizing factor will be the current leaking from the high-voltage terminal.

An object of my invention is to regulate the voltage of an electrostatic machine by controlling the leakage path from the high-voltage terminal in response to the voltage of the machine.

Another object of my invention is to produce a voltage regulator for an electrostatic machine comprising a leakage path which carries substantially no current until the voltage of the machine has risen to a predetermined value.

Another object of my invention is to produce a voltage regulator for an electrostatic machine which is adjustable over a wide range of operation.

Further objects and advantages of my invention will become apparent as the following description proceeds, and the features of novelty which characterize my invention will be pointed out with particularity in the claims annexed to and forming a part of this specification.

In the drawing, the single figure is a perspective view, partly in section, of an electrostatic machine utilizing my improved voltage-regulating device.

Referring to the drawing, I have shown an electrostatic machine 1 of the general type disclosed in Patent No. 1,947,220 granted February 13, 1934, to the General Electric Company on an application of Clifford A. Nickle. This electrostatic machine, which is shown more or less schematically, comprises a charge-accumulating body or high-voltage terminal 2 supported on an insulating pedestal 3. An endless belt 4 of paper or other suitable material, which is supported on rollers 5 and 6 and driven by an electric motor 7, conveys a charge imparted thereto by suitable exciting devices arranged in proximity to roller 6 to suitable collecting devices arranged inside of high-voltage terminal 2. Since the inside of the terminal is at zero potential, any charge conveyed to the collecting devices will flow in any conducting path provided to the outer surface of the terminal.

For the purpose of illustration, I have shown the electrostatic machine for exciting a hot cathode type X-ray tube 8 having a cathode or filament 9 and an anode 10. The anode 10 of the X-ray tube is connected between terminal 2 and ground by conductor 10a. The X-ray tube has an outer metallic cap 11 connected to the cathode 9 and extending into the terminal 2 in contact therewith, whereby the high voltage between terminal 2 and ground is applied to the tube. Current for lighting the filament of the X-ray machine may be supplied from any suitable source arranged in suitable relation to the electrostatic machine. For purposes of illustration, I have shown a storage battery 16 and a variable resistance 17 arranged within the high voltage terminal of the electrostatic machine for heating the filament 9.

My voltage regulator comprises in general an arrangement dependent upon the voltage of an electrostatic machine for varying a leakage path so that the leakage current will tend to prevent voltage rise above the desired value. In the particular form of my invention illustrated, the leakage path contains a discharge device and an electrostatic shield having its position dependent upon the voltage of the machine for varying the impedance characteristics of the discharge device, thereby varying the leakage current.

My voltage regulator which is shown generally at 18 comprises a leakage path, or circuit, between the terminal 2 and ground including a substantially spherical metal shell 19 having a circular opening 20 in the side facing the terminal, a needle-point electrode 41 arranged in the opening 20 and connected to the shell 19, and a conductor 13 connecting the shell 19 to ground. The shell 19 is suitably supported adjacent the terminal 2 upon a tubular insulating member 21 provided with a base 22. The shell is shaped to prevent corona discharge from taking place at the shell at the normal operating voltage of the electrostatic machine due to the charge induced upon it by the high voltage terminal 2, but due to the concentration of the electrostatic field at the point of electrode 41, a discharge would take place at the point of the electrode at the normal operating voltage of the machine. In order to control the discharge at the electrode 41, a movable circular disk or shield 23 is provided having an opening 42 through which the electrode 41 may project. The movable shield 23 is arranged in the opening 20 and shields the electrode 41 from the terminal 2, which changes the impedance characteristics of the discharge gap between the terminal 2 and electrode 41. The shield 23 is mounted on the end of a rod 24 which is supported by metal ribbons 27 and 28 attached to supporting pieces 29 and 30, secured to the shell 19 in any suitable manner, and is movable longitudinally in the direction of the axis of rod 24. A dashpot which includes a stationary cylinder 31 attached to the shell 19 and the movable piston 32 attached to the rod 24 is used to damp the longitudinal movement of the rod 24. A spring 34, the free end of which is slotted at 35 to encompass the movable rod 24 is supported at 33 within the shell 19. The spring bears against a transverse pin 36 in the rod 24 and biases the rod away from the high-voltage terminal 2. The biasing effect of the spring 34 may be adjusted by a thumb screw 37 which extends through a nut 38 attached to the shell 19 and is connected to the spring 34 at 39. The electrostatic force on the shield 23 tends to move the rod 24 toward the terminal 2 in opposition to the force exerted by the spring 34.

The electrode 41 is connected to the rod 24 by a lever system 40. This lever system comprises a lever 43 pivoted on a fixed pin 44 and having one end connected to bar 24 and the other end connected by means of a fork and pin connection to a floating link 45, which is in turn connected by a second fork and pin connection to one end of lever 46 pivoted on a fixed pin 47 and connected to its other end to electrode 41. It will be obvious that the pivot pins 44 and 47 may be fixedly supported with respect to shell 19 in any suitable manner. Pivot pins 44 and 47 are so located relative to the ends of levers 43 and 46 that when the disk 23 moves to the right, electrode 41 also moves to the right but at a greater speed. Accordingly, upon a predetermined movement of disk 23 toward terminal 2, which is caused by a predetermined voltage or charge on the terminal 2, the needle point of electrode 41 will extend far enough through perforation 42, so that a discharge will occur between the terminal 2 and the end of the electrode 41. The resulting current will tend to prevent further rise in voltage of terminal 2. While I have shown a single needle point 41, it is of course obvious that a plurality of such needle points with accompanying perforations 42 in disk 23 may be utilized.

In the operation of the construction which I have described, the filament temperature of tube 8 is first adjusted by means of variable resistance 17 so that the desired current will flow in the tube between the anode 10 and cathode 9. The electrostatic machine is now started and a voltage begins to build up on terminal 2. As the voltage builds up an electrostatic attractive force will be exerted upon disk 23 tending to move the disk toward terminal 2 against the biasing force of spring 34. When the voltage on terminal 2 becomes sufficiently great, the electrostatic attraction on disk 23 overcomes spring 34 and the disk moves to the right. This movement of disk 23 causes needle 41 to move in the same direction and, due to the multiplying lever system, needle 41 overtakes disk 23. So long as disk 23 is between needle 41 and terminal 2, the needle is effectively shielded from the terminal. When terminal 2 reaches the voltage for which the regulator has been adjusted, disk 23 will have been moved sufficiently to cause needle 41 to extend through perforation 42. Disk 23 will then no longer effectively shield point 41, and a corona discharge will be initiated between the point and the high-voltage terminal. When the corona discharge begins, current will leak from high-voltage terminal 2 to ground by way of conductor 13. The total current leaving terminal 2, that is, the sum of the load current and the leakage current, will now equal the current delivered to terminal 2 by the machine, and the voltage will remain at the desired value. If the voltage of terminal 2 is reduced sufficiently, the biasing effect of spring 34 will overcome the electrostatic attraction of terminal 2 for disk 23, and rod 24 will move to the left. When needle point 41, which now also moves to the left but at a greater speed than disk 23, overtakes disk 23, and no longer projects through perforation 42, disk 23 will again become effective as a shield and the corona discharge will be stopped. It is obvious from the above that the voltage on terminal 2 will be held within the desired range by the movement of needle 41 between shielded and unshielded positions.

My device may be adjusted for various voltages within a limited range by adjusting the tension of spring 34 by means of thumb screw 37. Further extension of the range of my device may be accomplished by moving pedestal 21 to increase or decrease the distance between the shell 19 and terminal 2.

It will be seen that I have provided a compact, simple regulating device of great flexibility and ease of adjustment. In addition to the obvious simplicity and ease of adjustment of my device, one of the principal advantages over the simple protective spark gap arrangement lies in the fact that no loss of current will occur until the voltage has risen to the predetermined point.

While I have disclosed a particular embodiment of my invention, I do not desire to be limited to the specific arrangement set forth and I intend in the appended claims to cover all modifications which do not depart from the spirit and scope of my invention.

What I claim as new and desire to secure by Letters Patent of the United States is:

1. An electrostatic machine having a terminal, a voltage regulator for said machine comprising a leakage circuit including a discharge gap having an electrode in the electrostatic field of said terminal, means shielding said electrode from said field for preventing current flow through said discharge device, and means responsive to the voltage of said terminal and varying the shielding of said electrode for varying the leakage current in said circuit.

2. An electrostatic machine having a terminal, a voltage regulator for said machine comprising a leakage circuit including a discharge gap having an electrode in the electrostatic field of said terminal, means shielding said electrode from said field for preventing current flow through said discharge device, and means controlled by said shielding means and moving said electrode to an unshielded position for varying the leakage current in said circuit.

3. An electrostatic machine having a terminal, a voltage regulator for said machine comprising a leakage circuit including a discharge gap having a needle point adjacent said terminal, a shield for said needle point for preventing current flow through said discharge gap, and means producing relative motion between said shield and said needle point for varying the impedance characteristics of said discharge gap to vary the leakage current in said circuit.

4. An electrostatic machine having a terminal, a voltage regulator for said machine comprising a leakage circuit including a discharge gap having a needle point adjacent said terminal, a shield for said needle point for preventing current flow through said discharge gap, and means dependent upon the electrostatic forces on said shield and producing relative motion between said shield and said needle point for varying the impedance characteristics of said discharge gap to vary the leakage current in said circuit.

5. An electrostatic machine having a terminal, a voltage regulator for said machine comprising a leakage circuit including a discharge gap having an electrode in the electrostatic field of said terminal, means shielding said electrode from said terminal for preventing current flow through said discharge gap, and means dependent upon the charge on said terminal for moving said electrode to unshielded position to vary the leakage current in said circuit.

6. An electrostatic machine having a terminal, a voltage regulator for said machine comprising a leakage circuit including a discharge gap having an electrode in the electrostatic field of said terminal, shielding means for said electrode movable between effective and ineffective positions for varying the leakage current in said circuit, and means responsive to the voltage of said terminal for moving said shielding means to either of said two positions.

7. An electrostatic machine having a terminal, a voltage regulator for said machine comprising a leakage circuit including a discharge gap having an electrode adjacent said terminal, means shielding said electrode from said terminal for preventing current flow through said discharge gap, said shielding means being movable in response to the electrostatic force exerted by said terminal on said shielding means for varying the shielding of said electrode to vary the leakage current in said circuit, means for biasing said shielding means against movement by said electrostatic force, and means for adjusting said biasing means.

8. An electrostatic machine having a terminal, a voltage regulator for said machine comprising a leakage circuit including a discharge gap having an electrode adjacent said terminal, a spherical casing adjacent said terminal and having an opening therein presented toward said terminal, a shield arranged in said opening and having an opening therein through which said electrode may project, means responsive to the electrostatic force exerted by said terminal on said shield for moving said shield, means for biasing said shield against movement by said electrostatic force, and means including a lever system connecting said electrode and said shield for moving said electrode in the same direction as said shield but at a greater rate.

9. An electrode for a discharge gap, means for electrostatically shielding said electrode and means responsive to the voltage across the gap and varying the shielding of said electrode for varying the impedance characteristics of the gap.

10. A needle point electrode for a discharge gap, a shield for said electrode, and means dependent upon the voltage across the gap and producing relative motion between said shield and said electrode for varying the impedance characteristics of the gap.

11. An electrode for a discharge gap, a shield for said electrode, said shield being movable in response to the electrostatic force exerted by another electrode of the gap on said shield for varying the impedance characteristics of the gap.

12. A shielded electrode for a discharge gap comprising a spherical casing having an opening adapted to be presented toward another electrode of said gap, a shield arranged in said opening and having an opening therein through which said shielded electrode may project, means responsive to the electrostatic force exerted by the other electrode on said shield for moving said shield, means biasing said shield against movement by said electrostatic force, and means including a lever system connecting said shielded electrode and said shield for moving said shielded electrode in the same direction as said shield but at a greater rate.

WILLIAM D. COOLIDGE.